United States Patent [19]

Cook

[11] 4,353,955
[45] Oct. 12, 1982

[54] POLYURETHANE FOAM - FABRIC COMPOSITE

[75] Inventor: John H. Cook, Livonia, Mich.

[73] Assignee: BASF Wyandotte Corporation, Wyandotte, Mich.

[21] Appl. No.: 320,173

[22] Filed: Nov. 12, 1981

[51] Int. Cl.³ .................. B05D 3/00; B29C 23/00; B29C 5/00; B32B 9/04
[52] U.S. Cl. .................. 428/246; 264/46.4; 264/46.8; 427/299; 427/322; 427/379; 428/266; 428/316.6; 428/425.5; 428/447
[58] Field of Search .............. 428/246, 266, 316.6, 428/425.5, 447; 427/299, 322, 379; 264/46.4, 46.8

[56] References Cited

U.S. PATENT DOCUMENTS

| | | | |
|---|---|---|---|
| 3,485,661 | 12/1969 | Campbell et al. | 428/266 |
| 3,759,742 | 9/1973 | Salamon et al. | 428/266 |
| 3,951,717 | 4/1976 | Herweg et al. | 428/319.1 |
| 4,130,614 | 12/1978 | Saidla | 264/46.4 |
| 4,175,155 | 11/1979 | Biranowski et al. | 428/316.6 |
| 4,304,812 | 12/1981 | Perkins | 428/316.6 |

*Primary Examiner*—William J. Van Balen
*Attorney, Agent, or Firm*—Norbert M. Lisicki; Bernhard R. Swick

[57] ABSTRACT

The present invention is directed to a method of applying a polyurethane foam to a fabric and the product produced thereof. This method involves:

(a) coating the fabric with a silicone surfactant, and
(b) expanding the polyurethane foaming mixture in contact with the coated portion of the fabric.

18 Claims, No Drawings

POLYURETHANE FOAM - FABRIC COMPOSITE

BACKGROUND OF THE INVENTION

1. Field of the Invention

The present invention relates to a method of applying polyurethane foam to fabric in which a polyurethane foaming mixture is expanded against the fabric for the purposes of adhering the foam to the fabric and to the product produced thereby.

2. Description of the Prior Art

Polyurethane foams are foamed by reacting a polyisocyanate with a polyol which may be a polyether containing hydroxyl groups or a polyester containing hydroxyl groups in the presence of a blowing agent, a catalyst and a surfactant. The blowing agent may be $CO_2$ generated by a water/isocyanate reaction. Other blowing agents include methylene chloride and fluorocarbons whereby heat generated when the polyisocyanate reacts with the polyol evaporates the blowing agent so it passes through the liquid mixture forming bubbles therein.

It is well known to those skilled in the art to apply such foams to fabrics by expanding a polyurethane foaming mixture against the fabric for the purpose of adhering the foam to the fabric.

The usefulness of fabrics in related articles having a foam sheet applied to one face thereof is well recognized. Of these composite foam fabric products, the most in demand are those in which a polyurethane foam is used. Heretofore, the most common method of applying foam to fabrics was first to form a thin sheet of foam and then apply the foam to the fabric by the use of an adhesive to foam a foam-fabric laminate. The use of adhesives has proven objectionable where the desired result is to form a composite foam-fabric product, such as a foam-fabric cloth, which must possess permability to air so that it can be said to breathe. Further, the adhesive in the resultant product tends to render the product less resilient, less flexible, more dense and less absorbent than ordinary homogeneous foam, and the foam-fabric cloth itself loses its drape.

In an effort to eliminate the adhesive from the composite and to form the composite product in the same process as the foam product is made, one method proposed was to spread a liquid chemical foaming mixture on a layer of fabric or to cover the unreacted foaming mixture with the fabric and then allow the mixture to expand. When pouring many flexible foam systems against a fabric, there is a tendency for the liquid mixture to be absorbed into the fabric as the bubbles are being formed. This causes the cells at the fabric-foam surface to collapse and coalesce into large cells and voids.

Accordingly, it is the purpose of the instant invention to provide an improved method of applying polyurethane foam to fabric whereby an improved composite product is produced.

| Pat. No. | Issued | References Inventor | Assignee |
| --- | --- | --- | --- |
| 4,139,503 | 2/13/79 | Kollmeier et al | Th. Goldschmidt AG |
| 3,669,913 | 6/13/72 | Morehouse | Union Carbide |
| 3,920,587 | 11/18/75 | Watkinson | Union Carbide |
| 4,163,830 | 8/7/79 | Windemuth et al | Bayer |
| 3,050,477 | 8/21/62 | Gmitter et al | General Tire |
| 4,147,847 | 4/3/79 | Schweiger | Dow Corning |
| 4,081,410 | 3/28/78 | Moeller | General Electric |
| 4,022,941 | 5/10/77 | Prokai et al | Union Carbide |
| 3,219,502 | 11/23/65 | Willy | Specialty Converters, Inc. |
| 4,092,387 | 5/30/78 | Parsson et al | Saab-Scania AB |

The Kollmeier et al, Morehouse, Watkinson, Windemuth et al, Gmitter et al, Schweiger, Moeller, and Prokai et al references all disclose the incorporation of silicone surfactants in a polyurethane foaming mixture. While this helps to prevent the problem described above, it has the drawback of creating a very closed-cell foam which shrinks even when crushed.

The Willy patent discloses a method of applying a polyurethane foam to a fabric wherein the fabric is previously treated with a liquid prior to applying the foam. Generally an aqueous liquid is applied, preferably tap water, prior to expansion of the foaming mixture on the fabric.

The Parsson patent discloses a method for producing articles of cellular plastic material provided with a surface covering of thermoplastic material or textile where the side of the covering facing the cellular plastic material is treated with a chemical substance. The cellular plastic material is then said to be able to expand freely in a mold and to bond to the covering without forming a deformed cellular structure in the boundary layer of the cellular plastic material adjacent to the covering. There is no disclosure in this patent of the use of a silicone surfactant.

SUMMARY OF THE INVENTION

The present invention is directed to a composite material comprising
(a) a layer of fabric
(b) a silicone surfactant coating on said fabric, and
(c) a layer of polyurethane foam affixed to said coated portion of said fabric.

These products are prepared by the method of applying a polyurethane foam to the fabric by expanding a polyurethane foaming mixture against the fabric as known in the prior art. In accordance with the instant invention, the prior art process is improved by
(a) coating the fabric with a silicone surfactant, and
(b) expanding the polyurethane foaming mixture in contact with the coated portion of the fabric.

DESCRIPTION OF THE PREFERRED EMBODIMENT

As used herein, the expression "fabric" includes a film or foil or thin layer of a textile fabric, or a plastic material such as a vinyl or polyurethane material with a textile fabric attached to one side thereof or reinforced plastic which is reinforced with a textile fabric.

The silicone surfactant coating is preferably applied to the fabric in an amount of about 0.1 to 2.0 grams per square foot.

Any silicone surfactant employed in the manufacture of polyurethane foams may be employed for this purpose. However, the preferred slicone surfactants are polysiloxane-oxyalkylene copolymers. An example of high molecular weight polymers of this type (hereinafter called siloxane-oxyalkylene copolymer A) is a hydrolyzable siloxane-oxyalkylene copolymer (hereinafter called siloxane-oxyalkylene copolymer A-I) expressed by the general formula (I)

$$(R')(SiO_3)_x(R_2SiO)_y[(C_nH_{2n}O)_zR'']_a[R''']_{3x-a} \quad (I)$$

wherein x is an integer of at least 1 and stands for the number of trifunctional silicon atoms; y is an integer of at least 3 and stands for the number of difunctional siloxane units; z is an integer of at least 5 and stands for the length of a polyoxyalkylene chain; a is an integer and stands for the number of polyoxyalkylene units; n is an integer of 2 to 4 and stands for the number of carbon atoms in an oxyalkylene group; R is a monovalent hydrocarbon group, e.g., alkyl or aralkyl; R' is an x-valent hydrocarbon group, e.g., when x is 1, a monovalent hydrocarbon group such as alkyl, when x is 2, a divalent hydrocarbon group such as alkylene, when x is 3, a trivalent hydrocarbon group and when x is 4, a tetravalent hydrocarbon group; R" is a monovalent hydrocarbon group, e.g., alkyl or aralkyl, forming a monoether group at the end of an alkylene chain; and R''' is an alkyl group or trihydrocarbylsilyl group at an end of a siloxane group, characterized by containing 10 to 80 percent by weight of polysiloxane units and 90 to 20 percent by weight of polyoxyalkylene units, having polysiloxane chains and polyoxyalkylene chains bonded with a C—O—Si bond and having a molecular weight of 1,000 to 16,000.

Alternatively, as siloxane-oxyalkylene copolymer A in the present invention can also be used a non-hydrolyzable siloxane-oxyalkyolene copolymer (hereinafter called siloxane-oxyalkylene copolymer A-II) expressed by the general formula (II)

$$R_3SiO(R_2SiO)_y[R'''O(C_nH_{2n}O)_zC_nH_{2n}SiRO]_wSiR_3 \quad (II)$$

wherein w is an integer of at least 1 and y, z, n, R and R''' are the same as defined in the above formula (I), characterized by containing 5 to 95 percent by weight, preferably 5 to 50 percent by weight of polysiloxane units and 95 to 5 percent by weight, preferably 95 to 50 percent by weight of polyoxyalkylene units, having a polysiloxane chain and a polyoxyalkylene chain bonded with a C—Si bond (instead of a C—O—Si bond) and having a molecular weight of 1,000 to 16,000.

As an example of a low-molecular-weight siloxane-oxyalkylene copolymer (hereinafter called siloxane-oxyalkylene copolymer B) there can be mentioned a hydrolyzable siloxane-oxyalkylene copolymer (hereinafter called siloxane-oxyalkylene copolymer B-I) expressed by the general formula (III)

$$(R')(SiO_3)_x(R_2SiO)_y[(C_nH_{2n}O)_zR'']_a[R''']_{3x-a} \quad (III)$$

where x is an integer of at least 1 and stands for the number of trifunctional silicon atoms; y is an integer of at least 3 and stands for the number of difunctional siloxane units; z is an integer of 0 or 1 to 4 and stands for the length of a polyoxyalkylene chain; a is an integer and stands for the number of polyoxyalkylene units; n is an integer of 2 to 4 and stands for the number of carbon atoms in an oxyalkylene group; R is a monovalent hydrocarbon group such as alkyl, aryl or aralkyl; R' is an x-valent hydrocarbon group, e.g., when x is 1, a monovalent hydrocarbon group such as alkyl and when x is 2, a divalent hydrocarbon group such as alkylene; R" is a monovalent hydrocarbon group such as alkyl, aryl or aralkyl and forms a monoether group at the end of a polyoxyalkylene chain; and R''' is an alkyl group or trihydrocarbylsilyl group at an end of a siloxane group, characterized by containing more than 80 percent by weight of polysiloxane units and less than 20 percent by weight of polyoxyalkylene units, having a polysiloxane chain and a polyoxyalkylene chain bonded with a C—O—Si bond and having a molecular weight of 500 to 10,000.

Alternatively, as siloxane-oxyalkylene copolymer B in the present invention can also be used a non-hydrolyzable siloxane-oxyalkylene copolymer (hereinafter called siloxane-oxyalkylene copolymer B-II) expressed by the general formula (IV)

$$R_3SiO(R_2SiO)_y[R'''O(C_nH_{2n}O)_zC_nH_{2n}SiRO]_wSiR_3 \quad (IV)$$

where w is an integer of at least 1, y, z, n, R and R''' are the same as defined in the above formula (III), characterized by containing more than 95 percent by weight of polysiloxane units and less than 5 percent by weight of polyoxyalkylene units, having a polysiloxane chain and a polyoxyalkylene chain bonded with a C—Si bond (instead of a C—O—Si bond) and having a molecular weight of 500 to 10,000. The above polysiloxane-polyoxyalkylene copolymers are described in U.S. Pat. No. 4,119,582.

The siloxane-oxyalkylene copolymer may be prepared by reacting a monoalkylene ether, preferably the allyl ether, of the desired polyoxyalkylene glycol with a siloxane containing SiH group.

The reaction is carried out by heating a mixture of the two reactants in the presence of a platinum catalyst such as chloroplatinic acid dissolved in a small amount of isopropyl alcohol, at temperatures from 100° to 200° C.

The siloxanes can be of four formulae:

$$R_aSi[(OSiMe_2)_n(OSiMeH)_dOSiMe_2H]_{4-a} \quad (1)$$

$$HMe_2Si(OSiMe_2)_n(OSiMeH)_bOSiMe_2H \quad (2)$$

$$Me_3Si(OSiMe_2)_n(OSiMeH)_cOSiMe_3 \text{ and} \quad (3)$$

$$R_aSi[(OSiMe_2)_n(OSiMeH)_cOSiMe_3]_{4-a} \quad (4)$$

wherein R is a hydrocarbon radical free of aliphatic unsaturation and contains from 1 to 10 carbon atoms, Me is a methyl radical, a has an average value from 0–1,
n has an average value from 6–240,
d has an average value from 0–30,
b has an average value from 1–30, and
c has an average value from 3–30 to the extent that the ratio of total Me$_2$SiO units to total $$\begin{array}{c} -Si-O \\ | \\ G \end{array}$$

units is within the range of 3.5:1 to 15:1, wherein

G is a radical of the structure —D(OR")$_m$A wherein D is an alkylene radical containing from 1 to 30 carbons atoms, A is a radical selected from the group consisting of the —OR', —OOCR' and —OCOR' radicals wherein R' is a radical free of aliphatic unsaturation selected from the group consisting of hydrocarbon and radicals, the A radical containing a total of less than eleven atoms, R" is composed of ethylene radicals and radicals selected from the group consisting of propylene and butylene radicals, the amount of ethylene radicals relative to the other alkylene radicals being such that the ratio of carbon atoms to oxygen atoms in the total OR" block ranges from 2.3:1 to 2.8:1, and m has an average value from 25 to 100.

Any of the siloxanes 1–4 or mixtures of siloxanes 1–4 can be utilized which give rise to a copolymer when reacted with an unsaturated glycol, in which the ratio of total Me$_2$SiO units to total

units are derived from the corresponding SiH units so that the same ratio of Me$_2$SiO units to SiH units prevails as for the Me$_2$SiO units to

units.

The above siloxanes are prepared by cohydrolyzing the appropriate siloxanes as for instance in (1) above, a mixture of silanes such as R$_a$SiX$_{4-a}$ with dimethyldichlorosilane, methyldichlorosilane, and dimethylmonochlorosilane and thereafter equilibrating the cohydrolyzate with an acid catalyst such as H$_2$SO$_4$. (2) is prepared by cohydrolyzing the silanes in proportion of n mols of dimethyldichlorosilane, two mols of dimethylmonochlorosilane, and b mols of methyldichlorosilane. Once again the hydrolyzate is H$_2$SO$_4$ equilibrated. (3) is prepared by cohydrolyzing the silanes in the proportion of n mols of dimethyldichlorosilane, two mols of trimethylmonochlorosilane and c mols of methyldichlorosilane. Once again the cohydrolyzate is equilibrated with H$_2$SO$_4$. (4) is prepared by cohydrolyzing one mole of silane of the formula R$_a$SiX$_{4-a}$ with n mols of dimethyldichlorosilane, c mols of methyldichlorosilane and at least 4−a mols of trimethylchlorosilane and thereafter equilibrating with H$_2$SO$_4$. In such case, X is chlorine.

Another method of preparing the siloxanes is to equilibrate siloxanes that have already been hydrolyzed. Such a method for instance would involve the equilibration at temperatures in excess of 50° C., a mixture of n units of Me$_2$SiO in the form of octamethylcyclotetrasiloxane, b units of (MeHSiO) in the form of (MeHSiO)$_4$ and 1 unit of (HMe$_2$Si)$_2$O in the presence of an equilibrating catalyst. Such equilibrating catalysts are known in the art and consist of acid clays, acid treated melamine type resins and fluorinated alkanes with sulfonic acid groups. For those unfamiliar with such preparations, they can be found in detail in U.S. Pat. No. 3,402,192 and that patent is hereby incorporated by reference.

The monoalkylene ether of the desired polyoxyalkylene glycol can be a copolymer of ethylene oxide and propylene oxide or copolymers of ethylene oxide and butylene oxide or can be copolymers of all three oxides. The ratio of ethylene radicals relative to the other alkylene radicals should be such that the ratio of carbon atoms to oxygen atoms in the glycol copolymer ranges from 2.3:1 to 2.8:1. In addition, the ends of the polyglycol chain not attached to the siloxane moiety have a group A wherein A is defined above.

These glycol copolymers can be linear or branched and can contain any number of carbon atoms.

One method of preparing the glycol copolymers is to dissolve sodium metal in allyl alcohol in a mole ratio of one to one and reacting the resulting product with the appropriate oxides at elevated temperatures and under pressure. The resulting product, after purification by removal of low boilers, is then capped with the appropriate group A.

The siloxane-oxyalkylene copolymer is then prepared by reacting the appropriate siloxane precursor and the appropriate polyglycol copolymer at elevated temperatures in the presence of platinum as the catalyst and a solvent if desired. These polysiloxane-polyoxyalkylene copolymers are described in U.S. Pat. No. 4,147,847.

The silicone coating may be applied in any suitable manner, such as painting with a brush or, most conveniently, by spraying. Neither temperature nor time is critical in this operation.

Any urethane foam formulation capable of being molded may be employed in the method of this invention. Such foam compositions, as is well known to those skilled in the art, are prepared from polyols and polyisocyanates in the presence of a foaming agent along with other possible additives.

Polyols which may be employed for reaction with the polyisocyanates to form the flexible polyurethane foams will generally have an equivalent weight of from about 500 to 10,000, preferably 3,000 to 10,000, and a functionality of from 2 to 8, and preferably from 2 to 3. Suitable compounds include hydroxyl-terminated polyesters, polyoxyalkylenepolyether polyols, and alkylene oxide adducts of organic compounds having at least 2 reactive hydrogen atoms such as amines, acids of phosphorus, dithiols, etc.

Any suitable hydroxyl-terminated polyester may be used such as is obtained, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-butyl-α-ethyl-glutaric acid, α,β-diethylsuccinic acid, phthalic acid, isophthalic acid, terephthalic acid, hemimellitic acid, and 1,4-cyclohexanedicarboxylic acid. Any suitable polyhydric alcohol, including both aliphatic and aromatic, may be used such as ethylene glycol, 1,3-propanediol, 1,2-propylene glycol, 1,4-butanediol, 1,3-butanediol, 1,2-butylene glycol, 1,5-pentanediol, 1,4-pentanediol, 1,3-pentanediol, 1,6-hexanediol, 1,7-heptanediol, 2-butene-1,4-diol, glycerol, 1,1,1-trimethylolpropane, 1,1,1-trimethylolethane, hexane-1,2,6-triol, α-methyl glucoside, pentaerythritol, and sorbitol. Also included within the term "polyhydric alcohol" are compounds derived from phenolic compounds such as 2,2-bis(4-hydroxyphenyl)propane, commonly known as Bisphenol A, and hydroxyalkyl ethers of such phenolic compounds such as bis-2-hydroxyethyl ether of hydroxyquinone.

The hydroxy-terminated polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above, or they may be made using the same components that make up the hydroxy-terminated polyester with only a portion of the components being a diamine such as ethylenediamine. The hydroxy-terminated polyester may also be a hydroxy-terminated polycaprolactone polyol.

Any suitable polyoxyalkylene ether polyol may be used such as the polymerization product of an alkylene oxide or of an alkylene oxide with a polyhydric alcohol. Any suitable polyhydric alcohol may be used such as those disclosed above for the use in the preparation of the hydroxy-terminated polyesters. Any suitable alkylene oxide may be used such as ethylene oxide, propylene oxide, butylene oxide, amylene oxide, and heteric or block copolymers of these oxides. The preferred polyoxyalkylene polyether polyols contain 5 to 70 percent of an ethylene oxide cap. The polyoxyalkylene polyether polyols may be prepared from other starting materials such as tetrahydrofuran and alkylene oxide-tetrahydrofuran copolymers; epihalohydrins such as epichlorohydrin; as well as aralkylene oxides such as styrene oxide. The polyalkylene polyether polyols may have either primary or secondary hydroxyl groups and, preferably, are polyethers prepared from alkylene oxides having from two to six carbon atoms such as polyethylene ether glycols, polypropylene ether glycols, and polybutylene ether glycols. The polyalkylene polyether polyols may be prepared by any known process such as, for example, the process disclosed by Wurtz in 1859 and *Encyclopedia of Chemical Technology,* Vol. 7, pp. 257–262, published by Interscience Publishers, Inc. (1951) or in U.S. Pat No. 1,922,459. Alkylene oxide adducts of Mannich condensation products are also useful in the invention. It is preferred that the polyol for reaction with the isocyanate contain 85 to 95 percent polyoxyalkylene polyether polyols. Preferably it should also contain 2 to 7 percent of one or more diols which are propylene oxide or ethylene oxide adducts of initiators such as ethylene glycol, propylene glycol, diethylene glycol, bisphenol A, butanediol or hexanediol.

Alkylene oxide adducts of acids of phosphorus which may be used include those neutral adducts prepared from the alkylene oxides disclosed above for use in the preparation of polyalkylene polyether polyols. Acids of phosphorus which may be used are acids having a $P_2O_5$ equivalency of from about 72 percent to about 95 percent. The phosphoric acids are preferred.

Any suitable hydroxy-terminated polyacetal may be used such as, for example, the reaction product of formaldehyde or other suitable aldehyde with a dihydric alcohol or an alkylene oxide such as those disclosed above.

Any suitable aliphatic thiol including alkane thiols containing at least two —SH groups may be used such as 1,2-ethanedithiol, 1,2-propanedithiol, 1,3-propanedithiol, and 1,6-hexanedithiol; alkenethiols such as 2-butene-1,4-dithiol, and alkynethiols such as 3-hexyne-1,6-dithiol.

Any suitable polyamine may be used including aromatic polyamines such as methylene dianiline, polyarylpolyalkylene polyamine (crude methylene dianiline), p-aminoaniline, 1,5-diaminonaphthalene, and 2,4-diaminotoluene; aliphatic polyamines such as ethylene diamine, 1,3-propylenediamine; 1,4-butylenediamine, and 1,3-butylene diamine, as well as substituted secondary derivatives thereof.

Hydroxy-containing compounds, which may be employed include graft polyols which may be employed alone or with the polyols set forth above. Preferably, the polyols comprise by weight 5 to 100 percent graft polyol and 0 to 95 percent conventional polyol of the type described above. The graft polyols are prepared by the in situ polymerization of the product of a vinyl monomer or monomers in a reactive polyol medium and in the presence of a free radical initiator. The reaction is generally carried out at a temperature ranging from about 40° C. to 150° C. The reactive polyol medium generally has an equivalent weight of at least about 500 and a hydroxyl number ranging from about 30 to about 600. The graft polyol has an equivalent weight of at least about 500 and a viscosity of less than 40,000 cps. at 10 percent polymer concentration.

A more comprehensive discussion of the graft polyols and their method of preparation can be found in U.S. Pat. Nos. 3,383,351; 3,304,273; 3,652,639; and 3,823,201, the disclosures of which are hereby incorporated by reference.

Also, polyols containing ester groups can be employed in the subject invention. These polyols are prepared by the reaction of an alkylene oxide with an organic dicarboxylic acid anhydride and a compound containing a reactive hydrogen atom. A more comprehensive discussion of these polyols and their method of preparation can be found in U.S. Pat. Nos. 3,585,185; 3,639,541; and 3,639,542.

The polyols described above for reaction with the polyisocyanate preferably should not contain more than 60 percent by weight polyoxyethylene groups.

In preparing the polyurethane foams of the subject invention, any suitable organic polyisocyanate or mixture thereof can be employed. Representative organic polyisocyanates correspond to the following formula:

$$R(NCO)_z$$

wherein R is a polyvalent organic radical which is either aliphatic, aralkyl, aromatic or mixtures thereof, and z is an integer which corresponds to the valence of R and is at least two. Representative organic polyisocyanates contemplated herein include, for example, the aromatic diisocyanates such as 2,4-toluene diisocyanate, 2,6-toluene diisocyanate, mixtures of 2,4- and 2,6-toluene diisocyanate, crude toluene diisocyanate, methylene diphenyl diisocyanate, crude methylene diphenyl diisocyanate and the like; the aromatic triisocyanates such as 4,4',4''-triphenylmethane triisocyanate, 2,4,6-toluene triisocyanates; the aromatic tetraisocyanates such as 4,4'-dimethyldiphenylmethane-2,2'-5,5'-tetraisocyanate, and the like; arylalkyl polyisocyanates such as xylylene diisocyanate; aliphatic polyisocyanate such as hexamethylene-1,6-diisocyanate, lysine diisocyanate methylester and the like; and mixtures thereof. Other organic polyisocyanates include polymethylene polyphenylisocyanate, hydrogenated methylene diphenylisocyanate, m-phenylene diisocyanate, naphthylene-1,5-diisocyanate, 1-methoxyphenylene-2,4-diisocyanate, 4,4'-biphenylene diisocyanate, 3,3'-dimethoxy-4,4'-biphenyl diisocyanate, 3,3'-dimethyl-4,4'-biphenyl diisocyanate, and 3,3'-dimethyldiphenylmethane-4,4'-diisocyanate. These polyisocyanates are prepared by conventional methods known in the art such as the phosgenation of the corresponding organic amine. Included within the useable isocyanates are the modifications of the above isocyanates which contain carbodiimide, allophanate or isocyanurate structures. Quasi-prepolymers may also be employed in the process of the subject invention. These quasi-prepolymers are prepared by reacting an excess of organic polyisocyanate or mixtures thereof with a minor amount of an active hydrogen-containing compound as determined by the well-known Zerewitinoff test, as described by Kohler in *Journal of the American Chemical Society*, 49, 3181 (1927). These compounds and their methods of preparation are well known in the art. The use of any one specific active hydrogen compound is not critical hereto, rather any such compound can be employed herein. Generally, the quasi-prepolymers have a free isocyanate content of from 20 percent to 40 percent by weight.

Crude polyisocyanate may also be used in the compositions of the present invention, such as crude toluene diisocyanate obtained by the phosgenation of a mixture of toluene diamines or crude polymethylene polyphenylene polyisocyanate obtained by the phosgenation of crude polymethylene polyphenylene polyamine.

The amount of organic polyisocyanate that is employed should generally be sufficient to provide about 0.9 to 1.3 isocyanate groups per hydroxyl plus amine group, if any, of the polyol.

Conventional surfactants may be incorporated to help form a foam from the liquid mixture as well as to control the size of the bubbles of the foam so that a foam of desired structure is obtained. Silicone surfactants are preferred for this purpose and particularly polysiloxane, polyoxyalkylene copolymers such as those described above and polymethylsiloxanes.

Conventional flame retardants can also be incorporated, preferably in amount of not more than about 20 percent by weight of the reactants.

In addition to the previously described ingredients, other ingredients such as catalysts, dyes, fillers, pigments and the like can be iincluded in the preparation of the foams.

Conventional fillers for use herein include, for example, aluminum silicate, calcium silicate, magnesium silicate, calcium carbonate, barium sulfate, calcium sulfate, glass fibers, carbon black and silica. The filler, if used, is normally present in an amount by weight ranging from about 5 parts to 100 parts per 100 parts of polyol.

A pigment which can be used herein can be any conventional pigment heretofor disclosed in the art such as titanium dioxide, zinc oxide, iron oxide, antimony oxide, chrome green, chrome yellow, iron blue siennas, molybdate oranges and organic pigments such as para reds, benzidine yellow, toluidine red, toners and phthalocyanines.

Any of the catalysts employed in the preparation of polyurethane foam can be employed in the subject invention. Rrpresentative of these catalysts include the amine catalysts such as diethylenetriamine, ketimine, triethylenediamine, tetramethylenediamine, tetramethylguanidine, trimethylpiperazine and the metaloorganic salt catalysts which are polyvalent metal salts of an organic acid having up to about 18 carbon atoms and being void of active hydrogen atoms. The organo portion of the salt may be either linear or cyclic or saturated or unsaturated. Generally, the polyvalent metal has a valence from about 2 to 4. Typical of these salts include: stannous acetate, stannous butyrate, stannous 2-ethylhexoate, stannous laurate, stannous oleate, stannous stearate, stannous octoate, lead cyclopentanecarboxylate, cadmium cyclohexanecarboxylate, lead naphthenate, lead octoate, cobalt naphthenate, zinc naphthenate, bis(phenylmercury)dodecyl succinate, phenylmercuric benzoate, cadmium naphthenate, dibutyltin dilaurate and dibutyltin-di-2-ethylhexoate. Generally, the total amount of both tin and amine catalysts ranges from about 0.0 to 2.0 parts by weight based on 100 parts by weight of the polyol. Preferred amounts of tin catalysts are 0.001 to 0.20 part by weight based on 100 parts by weight of the polyol while preferred amounts of amine catalysts are 0.05 to 1.0 part by weight based on 100 parts by weight of the polyol.

In preparing the foams of the present invention, any general procedure conventionally used for the preparation of urethane foams can be practiced. Generally speaking, such procedure entails the mixing together of ingredients with agitation until the foaming reaction commences. Such mixture is then poured into contact with the fabric whereby the polyurethane foaming mixture expands in contact with the coated portion of the fabric. Generally the pouring temperature is preferably from about 80° to 110° F. After foam formation ceases the resulting product is then cured at an ambient temperature and pressure, or curing may be accelerated through the use of higher temperatures. The preferred curing temperature ranges from about 25° C. to 150° C. and curing requires at least 3 minutes. There is no known maximum curing time and such foams have been prepared which were cured for one week or longer. Preferably the curing time should not require more than 24 hours. The foams employed in the instant invention should preferably have a density of about 1 to 15 pounds per cubic foot and should have a thickness from about 0.75 to 6 inches.

Suitable processes for the preparation of cellular polyurethane plastics are disclosed in U.S. Pat. No. Re. 24,514 together with suitable machinery to be used in conjunction therewith. When water is added as the blowing agent, generally in amount of about 1.0 to 5.5 percent by weight of the polyol, corresponding quantities of isocyanate to react with the water and produce carbon dioxide are used. It is also possible to proceed with the preparation of the polyurethane plastics by a prepolymer technique wherein an excess of organic polyisocyanate is reacted in a first step with a polyol, as described above, to prepare a prepolymer having free isocyanate groups which is then reacted in a second step with water to prepare a foam. Alternately, the components may be reacted in a single working step commonly known as the "one-shot" technique of preparing polyurethanes. Furthermore, instead of water, low boiling hydrocarbons such as pentane, hexane, heptane, pentene, and heptene; azo compounds such as azohexahydrobenzodinitrile; halogenated hydrocarbons such as dichlorodifluoromethane, trichlorofluoromethane, dichlorodifluoroethane, vinylidene chloride, and methylene chloride may be used in amount generally not greater than about 30 percent by weight of the polyol as blowing agents.

For more complete understanding of the present invention, reference is made to the following non-limiting examples wherein all parts are by weight unless otherwise noted.

EXAMPLE 1

A 12 percent solution of a polysiloxane polyoxyalkylene copolymer surfactant, identified herein as Surfactant No. 1, dissolved in methylene chloride was brushed onto the fabric side of a 8"×8" piece of textile fabric reinforced vinyl sheet. The solvent was then evaporated from the vinyl in an oven at 120° F. for 5 minutes. A conventional two-component, flexible polyurethane foam was handmixed and a portion was poured onto the surfactant coated fabric reinforced vinyl. A second portion was poured onto a second 8"×8" piece of fabric reinforced vinyl which had not been coated with the surfactant. The first component of the polyurethane foam mix had the following composition:

| Component | Parts by Weight |
| --- | --- |
| Polyol No. 1 | 93.0 |
| Polyol No. 2 | 7.0 |
| Water | 3.0 |
| Dabco WT | 1.4 |
| Polycat 33 | 0.2 |
| L5303 | 1.0 |

This was then mixed with an isocyanate, referred to herein as Isocyanate No. 1, which is an adduct of an 80/20 toluene diisocyanate and a diol of 600 molecular weight blended with undistilled diphenylmethane diisocyanate in a proportion of 54.5:45.5 by weight. The weight ratio of Isocyanate No. 1 to the above formulation is 100:61).

After allowing the foam to free-rise, it was cured in an oven for 10 minutes at 130° F. The foam was peeled from both pieces of vinyl and examined. The foam from the vinyl that was treated with the Surfactant No. 1 had a fine, uniform cell structure while the foam from the untreated vinyl was coarse-celled and had pulled away from the surface. A third piece of untreated vinyl was foamed in the same way with the same polyurethane foam composition but which had added to the foam composition the same polysiloxane polyoxyalkylene copolymer Surfactant No. 1 mixed in with the first component for the polyurethane foam and was contained in the mixture of 1 percent by weight. The foam in this case also had fine cells against the vinyl, but was very closed cell and shrunk even after crushing was attempted.

Thus it can be seen that the mere addition of Surfactant No. 1 to the foam composition does not give the superior results achieved when the same surfactant is coated onto the fabric.

In the above example Polyol No. 1 is a 4700 molecular weight polyol from trimethylolpropane and propylene oxide with an exthylene oxide cap, Polyol No. 2 is a 450 molecular weight ethoxylated adduct of bisphenol A, Dabco WT is the formate salt of triethylenediamine, a product of Air Products, Inc.

Polycat 33 is dimethylcyclohexylamine.

L5303 may be described as a silicone-glycol copolymer in which the silicone portion is basically siloxanes, glycol portions are essentially composed of ethylene oxide and propylene oxide, said products having a viscosity of 500 centistokes at 25° C. Such product is readily available on the market identified as Union Carbide L5303 Surfactant.

Surfactant No. 1 may be described as a silicone-glycol copolymer in which the silicone portion is basically methyl siloxane and the glycol portions are essentially composed of ethylene oxide and propylene oxide units, said product having a viscosity of 1500 centistokes at 25° C. Such product is readily available on the market under the trademark "Dow Corning 190 Surfactant."

EXAMPLE 2

Two 8"×8" pieces of textile fabric reinforced vinyl were cut from the same sheet. One piece was lightly sprayed with a 5 percent solution of silicone glycol copolymer Surfactant No. 1 dissolved in methylene chloride. The other piece was left untreated. The untreated piece was placed in the bottom of an 8"×8"×2" aluminum mold and heated to 120° F. Approximately 105 grams of a tow-component flexible urethane foam as described above in Example 1 was handmixed and poured into the mold with the ratio of the resin component to the isocyanate being 100:60 by weight. The urethane components were mixed for 5 seconds. After 6 minutes the foam with the vinyl sheet adhering to it was removed from the mold. The cell structure of the foam where it contacted the fabric back of the vinyl sheeting was coarse and voids had occurred at the corners of the molded foam.

A second foam pad was molded in the same way with the exception that the silicone treated vinyl piece was used instead of the untreated piece. The cell structure of this foam where it contacted the fabric side of the vinyl was found to be very fine-celled and no voids were obvious. Thus the improvement obtained by the use of the silicone treatment was clearly demonstrated.

EXAMPLE 3

This is an example of the application of this invention to a vacuum-formed textile fabric reinforced vinyl golf cart seat. The vinyl skin was preformed by vacuuming in a conventional manner and a two-component flexible urethane foam composition of the type described in the preceding examples was employed using a standard two-component low pressure foam machine. The mold was 40"×20"×4" deep and the vacuum formed skin was placed in the mold at a temperature of about 100° F. and held in place with a slight vacuum. One-half of the inside of the skin was sprayed with a 5 percent solution of silicone Surfactant No. 1 in a 1,1,1-trichloroethane solvent. It was applied at a coverage of about 0.7 grams of surfactant per square foot of the vinyl and the urethane foam mixture was dispensed into the mold at a rate of about 300 grams per second for 11.4 seconds. The lid of the mold was then closed and clamped in place. After 6 minutes the mold was open and the finished vinyl covered foam seat was removed. The vinyl cover was slit with a razor blade and strips were peeled away revealing the foam which adhered to it. It was observed that in the area that had been sprayed with surfactant, the cell structure of the foam was fine and uniform and no voids between the vinyl and the foam were evident. In the areas that had not been treated, the cell structure was coarse and irregular and a void was seen in one corner. Adhesion between the vinyl and the foam was the same for both the treated and the untreated vinyl. Thus this example clearly demonstrates the improvement obtained by silicone treatment of fabric reinforced vinyl in the production of a machine-poured molded seat.

EXAMPLE 4

An 8"×8" piece of textile fabric reinforced vinyl is spray treated and foamed as described in Example No. 1 with the exception that the silicone glycol copolymer brushed onto the fabric side of the vinyl is a silicone glycol copolymer in which the silicone portion is basically methyl siloxanes and the glycol portions are essentially composed of ethylene oxide and propylene oxide units, said products having a viscosity of 1000 centistokes at 25° C. Such product is readily available on the market identified as Union Carbide L540 Surfactant.

This produces a polyurethane foam-vinyl composite with a cell structure of the foam where it contacts the fabric back of the vinyl sheeting characterized by fine cells with no obvious voids.

EXAMPLE 5

An 8"×8" piece of textile fabric reinforced vinyl is treated with silicone glycol copolymer and polyurethane foam mixture poured thereon as described in Example 1 with the exception that the silicone surfactant is a silicone glycol copolymer in which the silicone portion is basically methyl siloxanes, the glycol portions are essentially composed of ethylene oxide and propylene oxide units, said product having a viscosity of 300 centistokes at 25° C. Such product is readily available on the market under the trademark "Dow Corning 197 Surfactant." This produces a polyurethane foam-vinyl composite with a cell structure of the foam where it contacts the fabric back of the vinyl sheeting characterized by fine cells with no obvious voids.

EXAMPLE 6

An 8"×8" piece of textile fabric reinforced polyurethane sheet is treated and foamed as described in Example 1.

This invention is useful in the manufacture of fabric reinforced vinyl covered foam for most applications, and particularly in seating applications such as tractor seats, snow mobile seats, golf cart seats, heavy equipment seats etc.

What is claimed is:

1. In the method of applying polyurethane foams to fabric by expanding a polyurethane foaming mixture against the fabric, the improvement comprising
   (a) coating the fabric with a silicone surfactant and
   (b) expanding the polyurethane foaming mixture in contact with the coated portion of said fabric.
2. The method of claim 1 wherein said fabric is textile fabric reinforced vinyl.
3. The method of claim 1 wherein said fabric is textile fabric reinforced polyurethane.
4. The method of claim 1 wherein said silicone surfactant coating on said fabric is about 0.1 to 2.0 grams per square foot.
5. The method of claim 4 wherein said silicone surfactant is a polysiloxane-polyoxyalkylene copolymer.
6. The method of claim 4 wherein said polyurethane is poured onto said surfactant coated fabric at a temperature of 80° to 110° F. and cured for at least 3 minutes at a temperature of from about 25° to 150° C.
7. The method of claim 6 wherein said silicone surfactant is a polysiloxane-polyoxyalkylene copolymer.
8. The method of claim 7 wherein said fabric is textile fabric reinforced vinyl.
9. The method of claim 7 wherein said fabric is textile reinforced polyurethane.
10. The composite material comprising
    (a) a layer of fabric,
    (b) a silicone surfactant coating on said fabric, and
    (c) a layer of polyurethane foam affixed to said coated portion of said fabric.
11. The composite of claim 10 wherein said fabric is textile fabric reinforced vinyl.
12. The composite of claim 10 wherein said fabric is textile fabric reinforced urethane.
13. The composite of claim 10 wherein said silicone surfactant coating on said fabric is about 0.1 to 2.0 grams per square foot.
14. The composite of claim 13 wherein said silicone surfactant is a polysiloxane-polyoxyalkylene copolymer.
15. The composite of claim 13 wherein said polyurethane is poured onto said surfactant coated fabric at a temperature of 80° to 110° F. and cured for at least 3 minutes at a temperature of about 25° to 150° C.
16. The composite of claim 15 wherein said silicone surfactant is a polysiloxane-polyoxyalkylene copolymer.
17. The composite of claim 16 wherein said fabric is textile fabric reinforced vinyl.
18. The composite of claim 16 wherein said fabric is textile fabric reinforced polyurethane.

* * * * *